United States Patent [19]

Lu

[11] Patent Number: 5,544,486
[45] Date of Patent: Aug. 13, 1996

[54] DUAL OUTLET TURBOCHARGER AND TWIN AFTERCOOLERS FOR A DIESEL ENGINE

[75] Inventor: Yao-Shun Lu, Erie, Pa.

[73] Assignee: General Electric Company, Erie, Pa.

[21] Appl. No.: 355,719

[22] Filed: Dec. 14, 1994

[51] Int. Cl.⁶ .................................................. F02B 29/04
[52] U.S. Cl. ................................ 60/599; 60/605.1
[58] Field of Search ...................... 60/599, 605.1, 60/605.3, 612; 123/503, 184.34

[56] References Cited

U.S. PATENT DOCUMENTS

| | | | |
|---|---|---|---|
| 2,200,744 | 5/1940 | Heinzelmann | 60/612 |
| 2,739,440 | 3/1956 | Seifert et al. | 60/599 |
| 2,858,666 | 11/1958 | Fullemann | 60/599 |
| 5,392,604 | 2/1995 | Nikula et al. | 60/605.3 |

FOREIGN PATENT DOCUMENTS

| | | | |
|---|---|---|---|
| 1296735 | 3/1987 | U.S.S.R. | 60/605.1 |
| 1710799 | 2/1992 | U.S.S.R. | 60/605.1 |

*Primary Examiner*—Michael Koczo
*Attorney, Agent, or Firm*—Jill M. Breedlove; Marvin Snyder

[57] ABSTRACT

A retrofit turbocharger and aftercoolers for a diesel engine (suitable for a locomotive application) are able to supply the intake air for the engine more efficiently and effectively so as to provide a significant improvement in operating efficiency for the engine without any major physical alterations to the existing diesel engine.

6 Claims, 9 Drawing Sheets

DUAL OUTLET TURBOCHARGER AND TWIN AFTERCOOLERS FOR A DIESEL ENGINE

The ALCO® Series 251 Diesel Engine has been in production for about 40 years and has an enviable performance and service record. Because of its excellent performance and overall reliability and durability, many railway utilities have large numbers of these engines still performing their daily tasks in their fleet of railway locomotives. As time passes, pressure from governments and environmentalists compels the manufacturer of replacement locomotive parts to attempt to provide modifications which improve the performance of the overall machine, and increases the life expectancy of the machine. It is with objectives such as these in mind, that the improvements such as are found in this invention have been made.

The ALCO® Series 251 Diesel Engine is a turbocharged diesel engine operating at a designed operating speed of from 400 to 1200 rpm. The engine has been equipped with a rotating turbocharger which compressed the intake air up to a pressure of 30 psi at a temperature of 185° C. when operating at an ambient temperature of 27° C.

The compressed air has been ducted from the turbocharger through a single duct, to a single liquid cooled heat exchanger to remove heat from the compressed air before being fed to the intake manifold.

The turbocharger is driven by the engine exhaust gasses delivered to the rear of the turbocharger by a pair of suitable ducts, and lubrication for the turbocharger is provided from the forced oil lubrication system of the diesel engine.

The ALCO® 251 Diesel Engine and the ALCO® 165 turbocharger described above were designed to work in combination to provide an operating engine having operating characteristics which met acceptable design specifications and which gave a satisfactory engine and turbocharger operation life.

Because the engine and turbocharger were designed to function as an operating pair, the space reserved for the ALCO® 165 turbocharger and the mounting interfaces on the engine are such as to accommodate the ALCO® 165 turbocharger.

It is with these constraints in mind that the present invention was conceived and developed, and although some improvement in operating efficiency was contemplated, the improvement experienced from the presence of the twin discharge ducts coupled with twin intercoolers was substantially more than expected.

It is therefore an object of this invention to take an existing ALCO® Diesel Engine equipped with a standard ALCO® 165 turbocharger and upgrade its performance and efficiency by the simple replacement of the ALCO® 165 turbocharger with a modified twin duct discharge type turbocharger with twin aftercoolers. The replacement of the ALCO® 165 turbocharger would appear to be a straight forward procedure, but in reality the replacement of the ALCO® 165 turbocharger with a General Electric 7S1716 turbocharger is indeed an exercise involving considerable skill and foresight when one considers that the resultant engine and turbocharger aftercooler combination must meet certain size and weight restraints. The requirement that no modifications be made to the engine to accept the twin discharge turbocharger with its associated after cooler(s) adds substantial complexity to the problem.

The ALCO® engine to which this invention relates is the ALCO® Model 251 Services "V"-type diesel engine previously manufactured under license by Bombardier Inc. in Quebec, Canada and until recently manufactured by General Electric Canada Inc. in Quebec, Canada.

SUMMARY OF THE INVENTION

According to this invention, there is provided a replacement turbocharger for the ALCO® 165 turbocharger mated to the ALCO® 251 engine in its original design. The ALCO® Engine when modified by the replacement of the prior art turbocharger will demonstrate improved operating efficiency and performance over the prior art combination. The replacement turbocharger is designed to be fitted to feed a pair of intercoolers which will feed cooled air into the same engine intake manifold as the previous prior art ALCO® 165 turbocharger and its single intercooler. The replacement turbocharger has the advantage of utilizing the technology of a later date and the air flow improvement resulting from the twin output ducts coupled to a pair of intercoolers which also have the advantage of improved heat transfer technology over the prior art intercooler leads to a turbocharger intercooler combination that delivers the required air to the intake manifold at a lower temperature and lower energy input so that an improved engine efficiency is achieved.

A BRIEF DESCRIPTION OF THE DRAWINGS

The following is a more detailed description of some of the embodiments of the invention by way of example

DESCRIPTION OF THE PREFERRED EMBODIMENT

Figure 1:
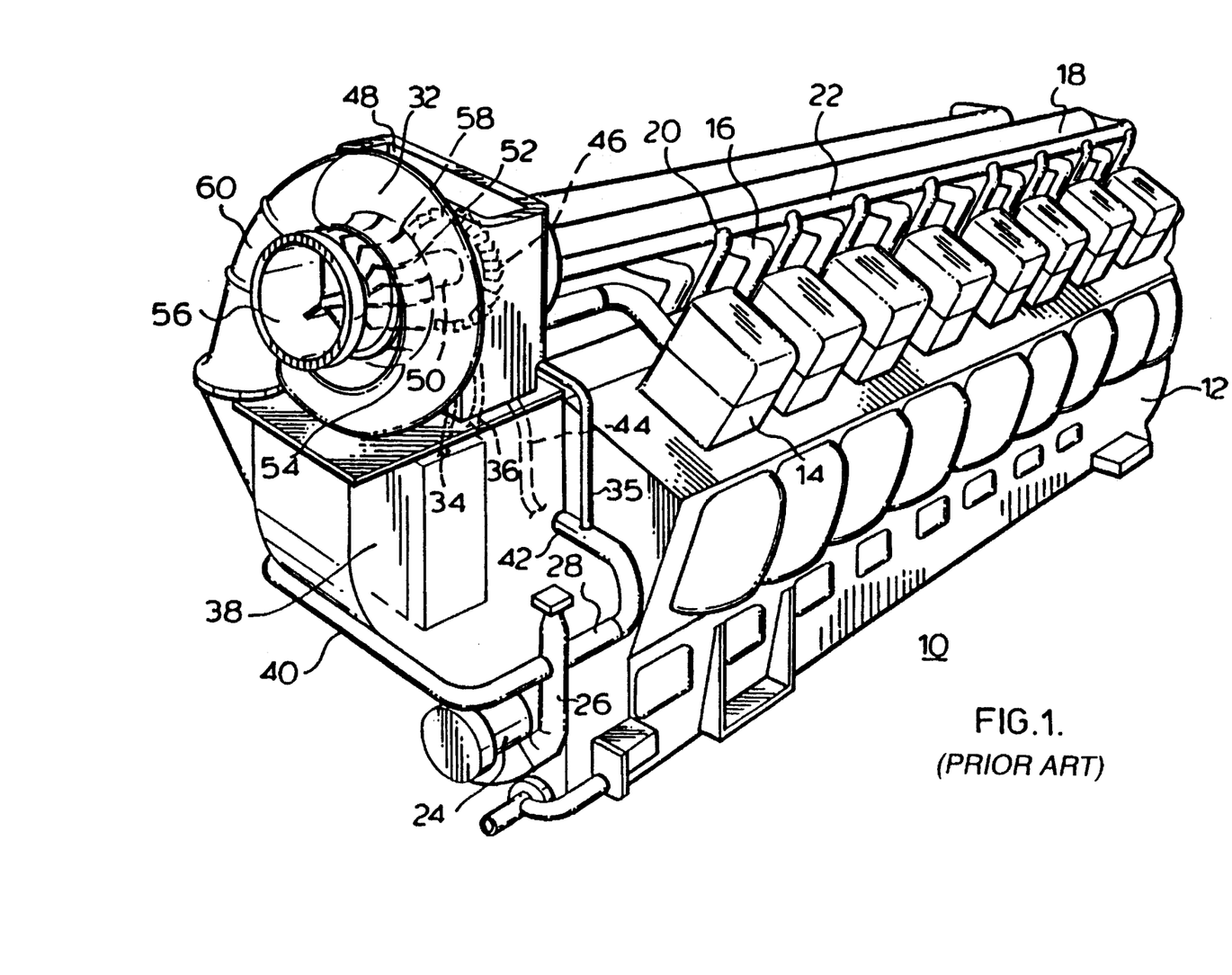
FIG. 1 is a perspective view of an ALCO® 251 Series V-16 engine having a prior art turbocharger and single aftercooler mounted thereon.

Referring to the drawings and FIG. 1 in particular, a prior art 16 cylinder ALCO® 251 Series engine is shown (circa 1970) with a turbocharger feeding compressed air to a single intercooler. Basically the ALCO® Engine 10 is shown having a block 12, on which are mounted heads such as the one shown as 14. The cylinder head such as the one shown at 14 is essentially hollow, and provides amongst other things, the necessary valving for the supply and removal of the various gasses necessary for the operation of the engine.

Each head is supplied with a duct located deep in the "VEE" in the block (not shown in FIG. 1) which provides communication between the intake manifold and the intake port of each head. Each head 14 is also supplied with an exhaust duct 16 which communicates between the exhaust port of each head and exhaust manifold 18. Each head is also provided with a coolant duct 20 which is connected to coolant header 22.

A coolant pump 24 is driven by the engine 10 to deliver coolant via conduit 26 to conduit 28 which feeds coolant into block 12 of engine 10. Coolant is also ducted to turbocharger 32 by means of flexible hoses 34 and 36. Similarly, coolant is fed to the intercooler 38 by means of conduits 40 and 42.

It is essential that the turbocharger have abundant lubrication. Thus oil is supplied to the turbocharger via conduit 44.

The turbocharger 32 is supplied with a power wheel 46 which extracts energy from the exhaust gas stream being fed to the rear of the turbocharger by exhaust header 18. The ALCO® turbine is preferably driven up to a speed of 18,000 rpm by the hot exhaust gas. The exhaust gas exits via port 48 to atmosphere.

Power wheel 46 is connected to shaft 50 which is suitably journaled in bearings and seals and on the remote end of shaft 50 is mounted a compressor impeller 52. Turbocharger 32 is provided with an intake housing 54 which is mated to impeller 52. Housing 54 has an intake port 56 which is supplied with air at atmospheric temperature and pressure. The air passes through impeller 52 and into diffuser 58 and thence to discharge duct 60 and into intercooler 38 where the temperature of the compressed intake air is reduced as the heat flows into the coolant which circulates through the intercooler.

The compressed air (now cooled) is fed into the intake manifold (located in the "VEE" of the engine, not shown) and into intake ducts, where it is subsequently fed by the head valves to each cylinder.

This is the traditional ALCO® 251 Diesel Engine which Is turbocharged and which has performed successfully in the field for 40 years.

Before describing the improvement, a few comments about the general limitations of the physical parameters of the engine would be in order.

The engine 10, when fitted with a turbocharger and intercooler, must fit within very critically specified dimensions as defined by the engine cab structure at the locomotive. Thus, the restriction imposed by space limitations of the cab poses a very substantial problem for any modification to the turbocharger intercooler system.

It must also be remembered that in order to be successful, any modified turbocharger and intercooler must be a "bolt-on" assembly which can mate to the existing engine structure without substantial modification to the engine block assembly. It is necessary that the modified turbocharger be mounted such that the exhaust gas header, outlet port, etc. be compatible to the existing installation. Similarly, the inlet port of the compressor must mate to existing intake ducting. The turbocharger requires lubrication and cooling and the intercooler(s) require(s) the presence of circulating coolant.

All of the above criteria have been met by the modified turbocharger-intercooler system without causing alterations to the block, or engine cab enclosure. A minimum of changes are required to the air flow system, the lubrication system and the coolant system.

Figure 2:
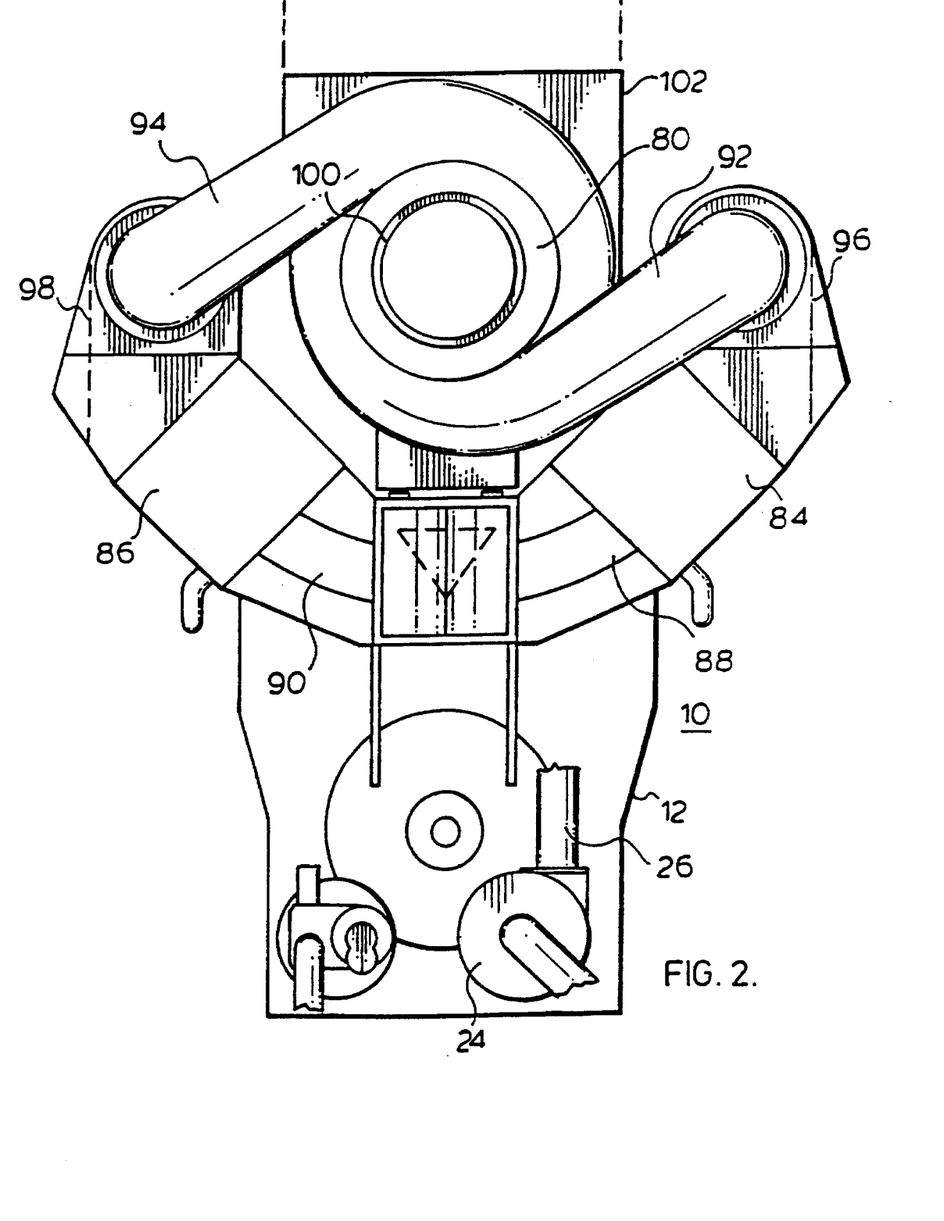
FIG. 2 is a frontal view of the ALCO® Series V-16 engine having a GE dual discharge turbocharger and a pair of improved aftercoolers.
Figure 3:
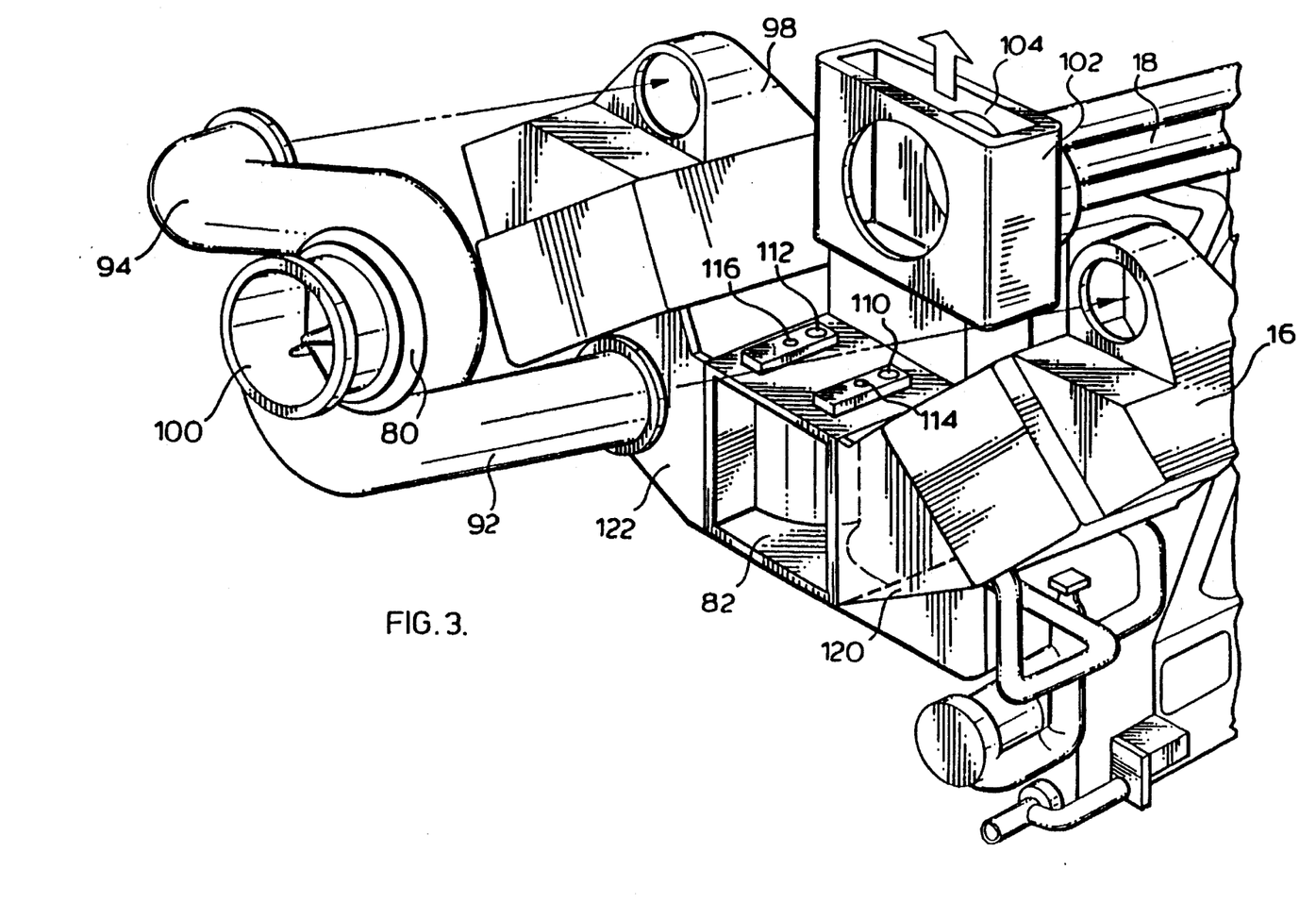
FIG. 3 is an exploded perspective view of the turbocharger-aftercooler of FIG. 2.
Figure 4:
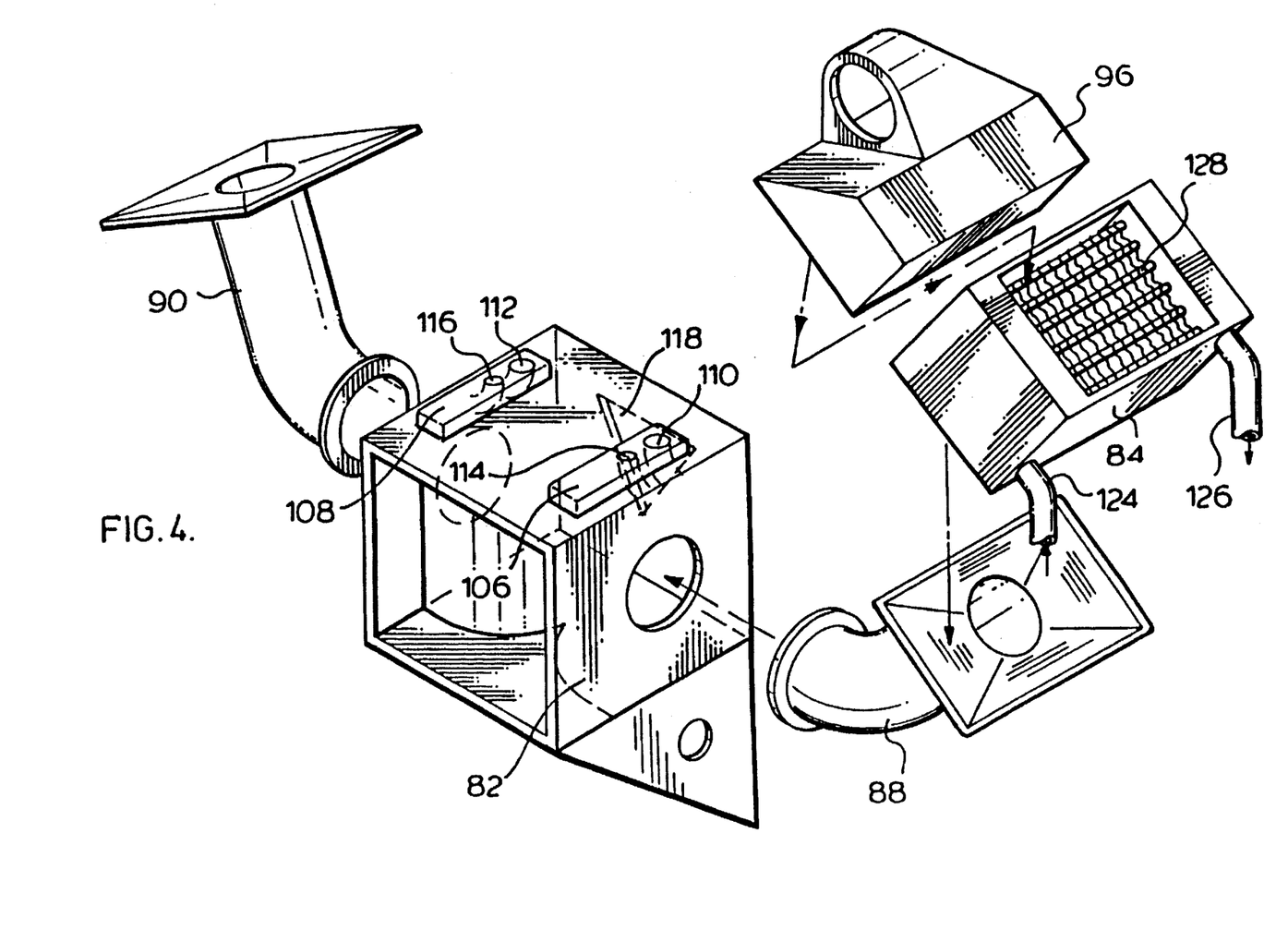
FIG. 4 is a detailed exploded view of the turbocharger-aftercooler showing the air flow pattern.

Referring now to FIGS. 2, 3 and 4 which shows the same basic ALCO® engine as illustrated in the FIG. 1 prior art with the exception of the turbocharger intercooler. The turbocharger is a standard General Electric GE 7S1716 turbocharger and dual intercoolers. FIG. 2 shows a front view of the ALCO® 251 engine 10 having the same block 12 as shown in FIG. 1. Turbocharger 80 is mounted on adapter assembly 82. Adapter assembly 82 is a hollow structural member which is sealingly connected to block 12 to feed cooled compressed air to the "VEE" in block 12 which functions as part of an intake manifold for engine 10. Mounted on assembly 82 are a pair of intercoolers 84 and 86. Intercoolers 84 and 86 have a pair of ducts 88 and 90 which feed cooled compressed air to the interior of hollow assembly 82.

The intercoolers are coupled to the turbocharger 80 by means of a pair of ducts 92 and 94 and a pair of adapters 96 and 98 for mating the ducts 92 and 94 to intercoolers 84 and 86.

Turbocharger 80 has an inlet port 100 for the admission of atmospheric air. The rear of turbocharger 80 has a housing 102 to enclose the power wheel of the turbocharger which housing is mated to exhaust manifold 18 to duct hot exhaust gas through the power wheel. Turbocharger exhaust housing 102 has a port 104 similar to port 48 of turbocharger 32 of FIG. 1 to allow simple installation of the exhaust gas duct from port 104. Similarly, intake port 100 is such that it will connect to the duct carrying intake air to the port 56 of turbocharger 32.

Turbocharger 80 requires coolant and lubrication and adapter assembly 82 is provided with suitable facilities for the turbocharger. Turbocharger 80 is mounted on a pair of bosses 106 and 108 which mate with the lower mountings of turbocharger 80. Bosses 106 and 108 are supplied with cooling ducts 110 and 112 and a pair of lubrication ducts 114 and 116. These ports are aligned with similar ports in the lower mounting rails of the turbocharger to assure required cooling and lubrication of the turbocharger.

Member 82 is provided with a "VEE" opening 118 at the rear thereof for the exodus of compressed air to the intake manifold in block 12. The member 82 is mounted on block 12 in a sealed relationship, similarly, the ducts 88 and 90 are sealed to the member 82. The intercoolers 84 and 86 are supported on member 82 by supporting webs 120 and 122 at the front of the assembly and by corresponding webs at the rear of member 82 (not shown).

Intercoolers 84 and 86 are supplied with coolant from the coolant system driven by pump 24. Although the connecting hoses are not shown in FIG. 2, the hose terminations are shown at 124 and 126 in FIG. 4. Intercoolers such as 84 are off-the-shelf items and the mounting selected for this application is such that the tubes such as 128 are shown extending parallel to the axis of the crankshaft of the engine. The particular orientation of the intercoolers is chosen to optimize the compactness of the retrofit assembly. By mounting the intercoolers at the orientation chosen, it is possible to drastically increase the area of exposure of the heat transfer surface for the compressed air. Thus, the cooling of the compressed air is increased substantially. Additionally, because two intercoolers may be "close packed" in this configuration, the degree of "choking" of the intake air is substantially decreased because only one half the compressed air needs to pass through each intercooler, as compared to the single intercooler shown in FIG. 1.

Basically, there are several components of this improved engine that are not readily alterable physically. These are:

(1) engine block (12)
(2) exhaust manifold 18
(3) water pump (24)
(4) water header (22)
(5) lubrication oil pump (not shown)

It is the judicious selection, placement and orientation of the turbocharger and intercoolers that allow this improvement to achieve its operational efficiency on an existing diesel engine whilst keeping most of the ducting supplying the hot exhaust gas to power the turbine, the intake air ducting and the connection to the intake engine manifold virtually unchanged.

Figure 5:
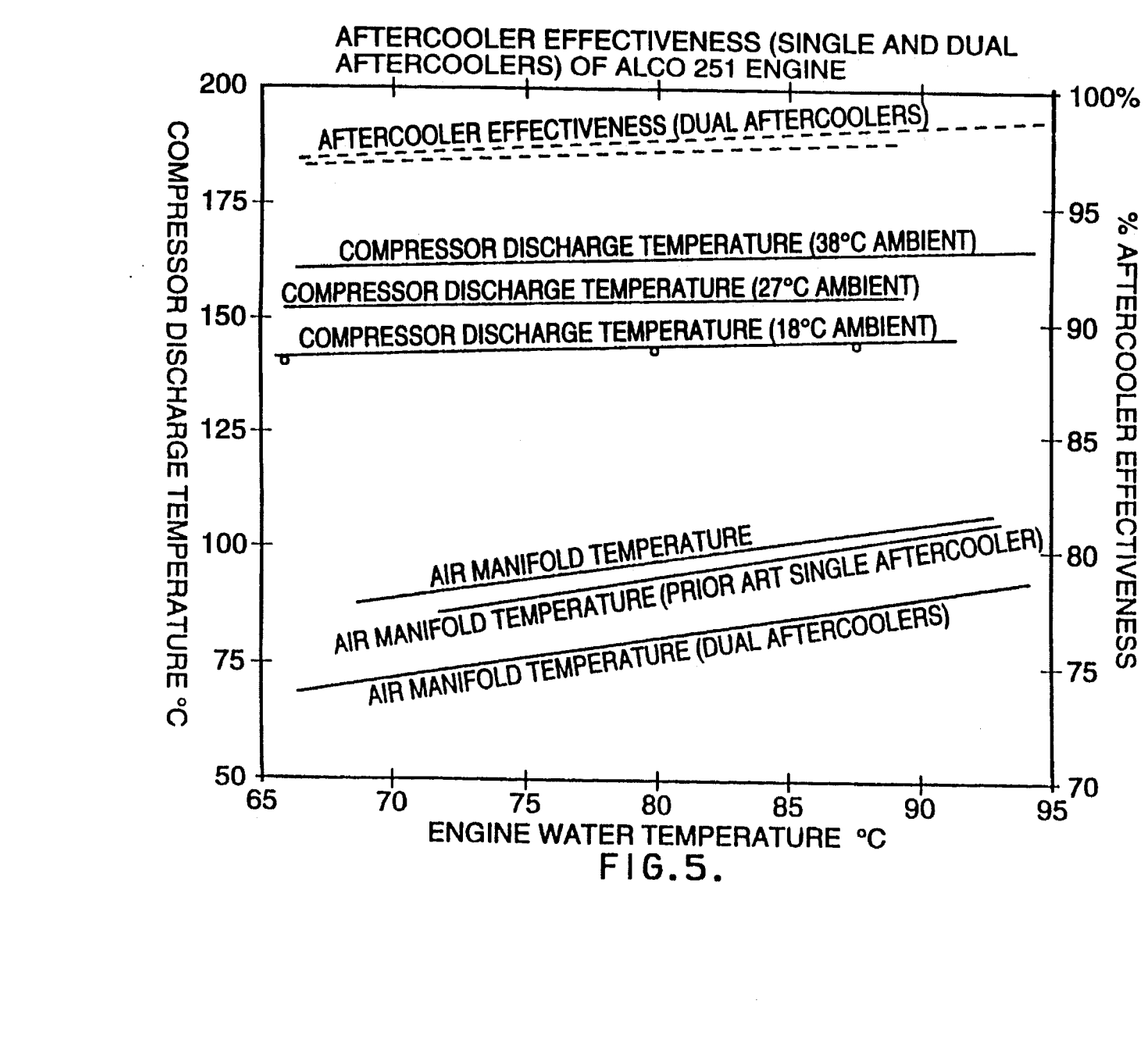
FIG. 5 is a graph showing aftercooler efficiency for various cooling water and ambient temperatures.

The following graphs are helpful in gaining an insight to the advantage provided by the combination turbocharger-aftercooler combination. FIG. 5 shows how the dual aftercoolers are able to lower the temperature of the compressed air for various ambient temperatures of air entering the turbocharger.

Ambient temperatures of 18°, 27° and 38° C. were chosen to determine the effectiveness of the aftercoolers. The advantage of the dual aftercoolers is shown by the AIR MANIFOLD TEMPERATURE where the temperature of the compressed air is reduced very nearly to that of jacket water temperature of the engine. The single aftercooler proved to have less effectiveness with the temperature of the AIR MANIFOLD TEMPERATURE being some what more elevated, thus, lessening the efficiency of the aftercooler to about 75–80% as compared to 95–98% for the dual aftercooler arrangement.

Figure 6:
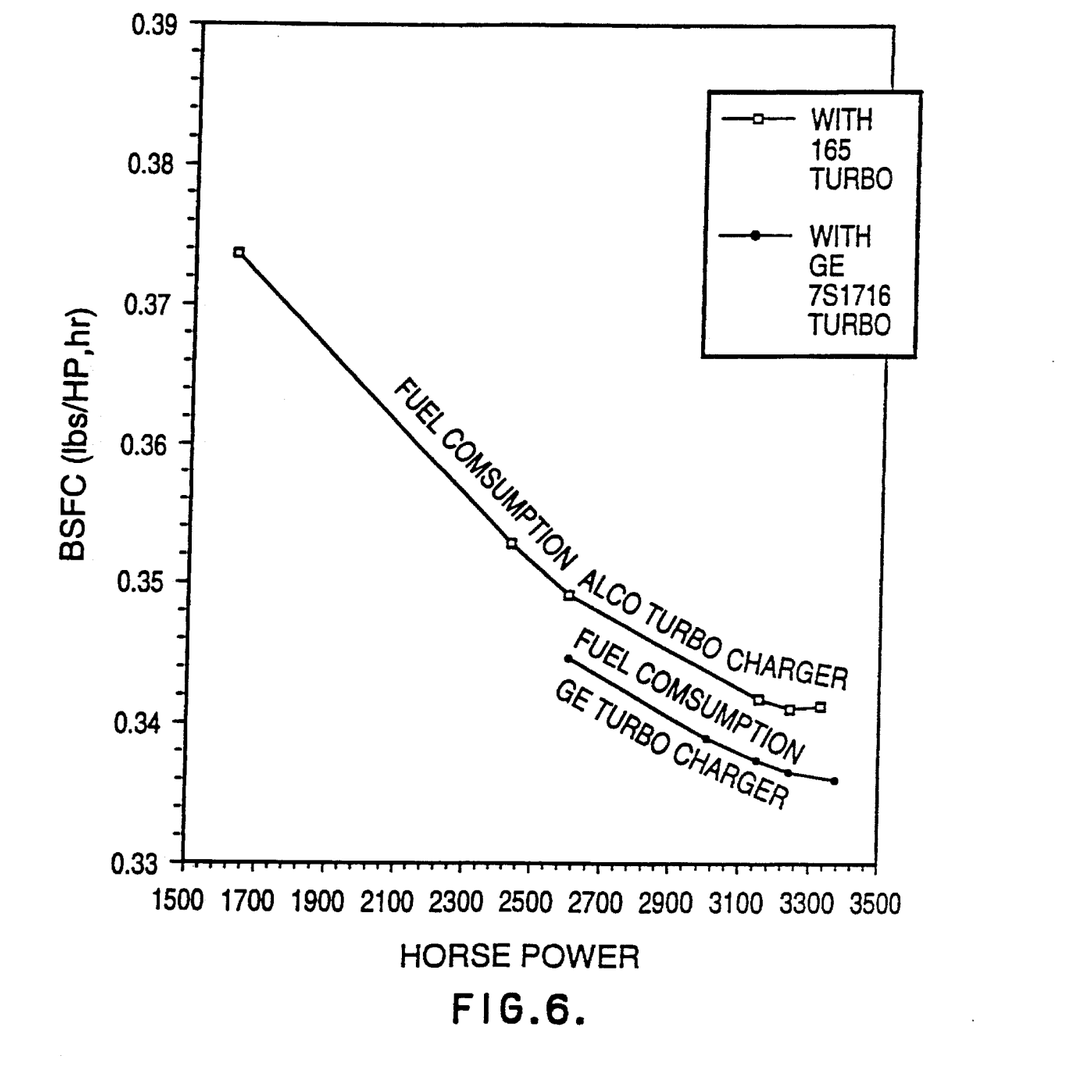
FIG. 6 is a graph showing the specific fuel consumption for constant engine speed.
Figure 7:
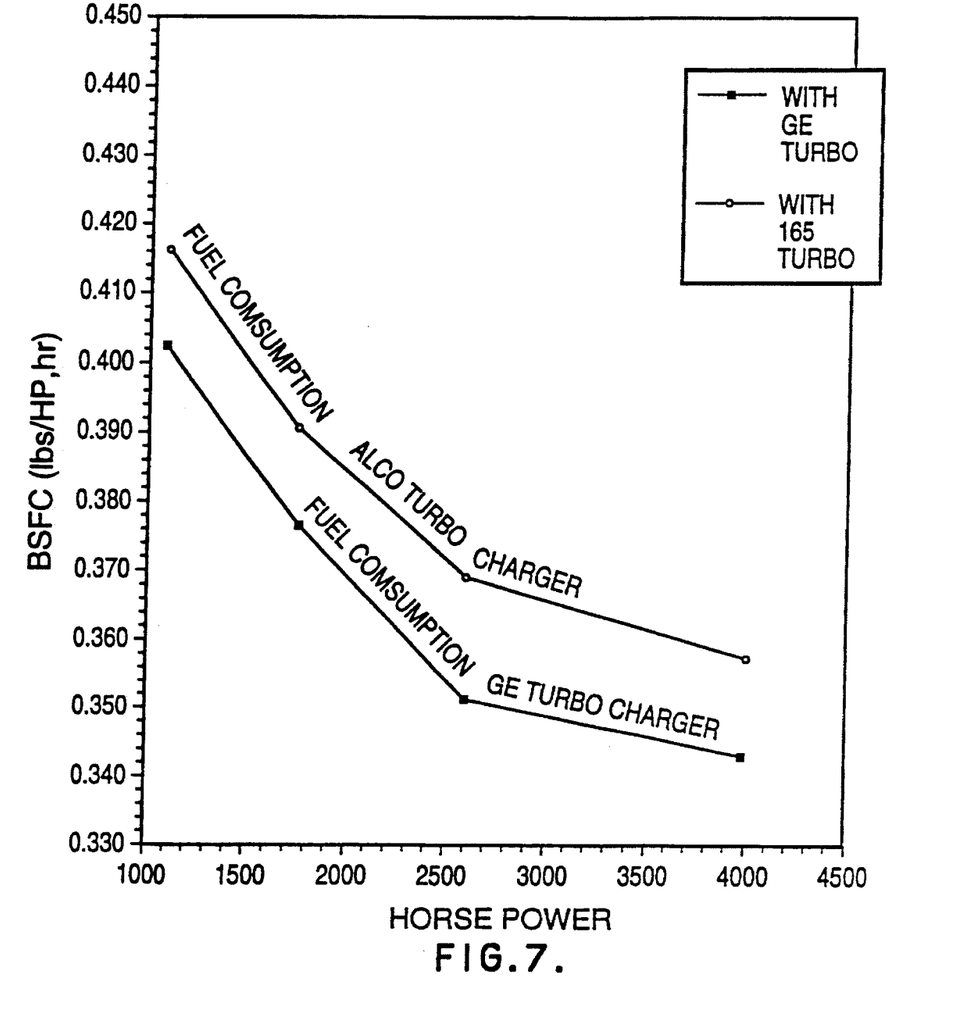
FIG. 7 is a graph showing the specific fuel consumption for horsepower produced.

FIG. 6 gives a comparison of fuel consumption of the ALCO® 251 with the single and dual aftercoolers. In this manner, the Brake Specific Full Consumption (BSFC) provides an excellent indication of how the engine will consume fuel (at a constant 1000 rpm) for various horsepower outputs. The BSFC is improved by 1.8 to 3.8% at the various engine ratings due to the increase in turbocharger efficiency from 76 to 83% and the improvement in aftercooler effectiveness of 80 to 95%. FIG. 7 provides the same type of result for various horsepower outputs (at various speeds) and the improvement in fuel efficiencies is immediately obvious.

Figure 8:
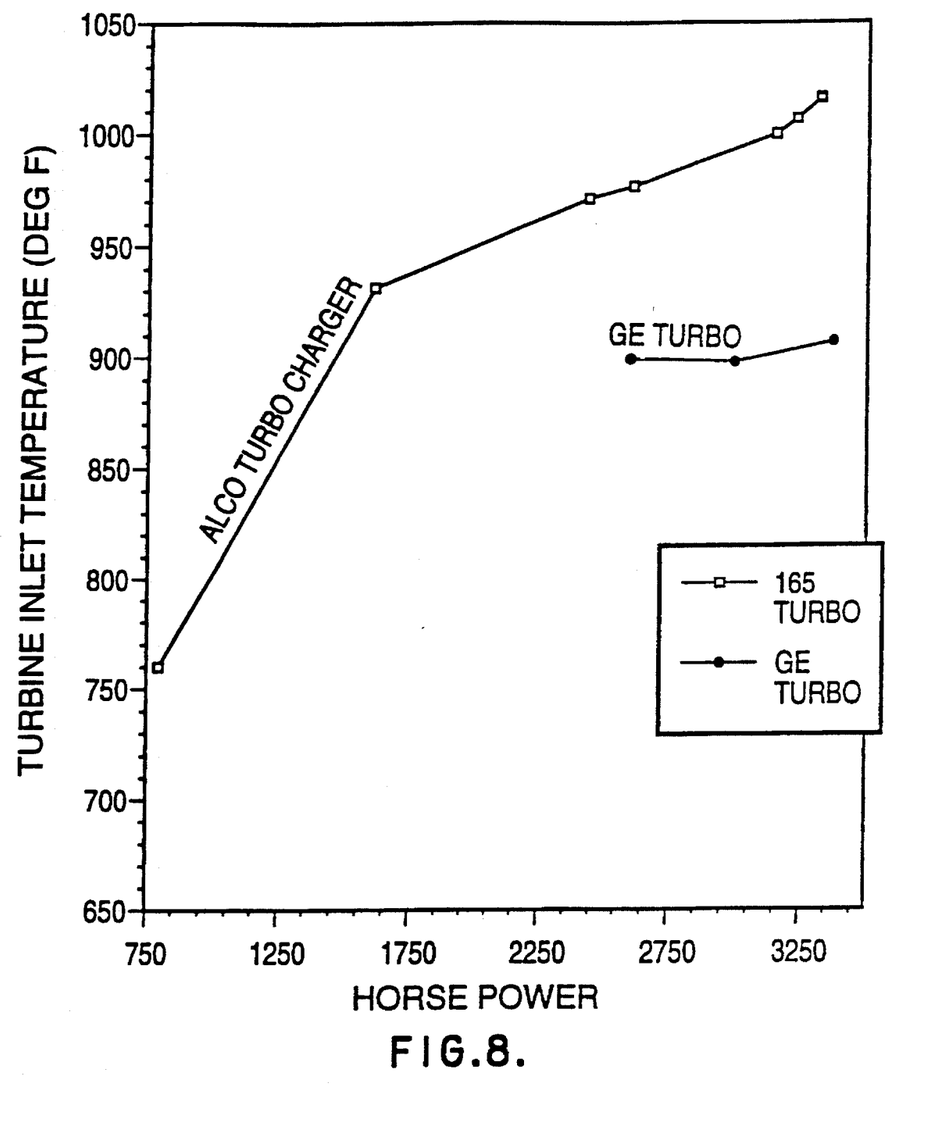
FIG. 8 is a graph of turbine inlet temperature for the prior art turbocharger and the modified turbocharger-aftercooler of this invention.
Figure 9:
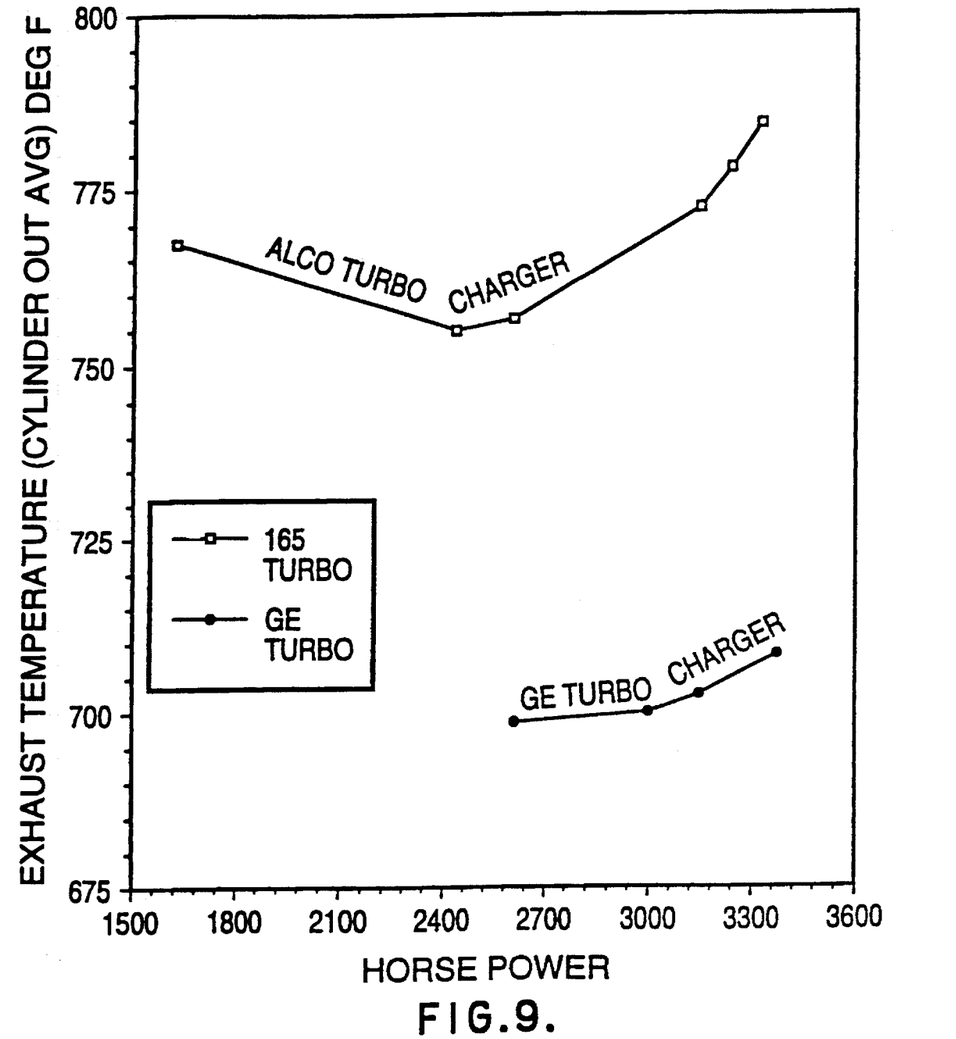
FIG. 9 is a graph showing the exhaust temperature of the prior art turbocharger aftercooler and the modified tubocharger aftercooler of this invention.

FIGS. 8 and 9 show the effects of the dual aftercooler on the exhaust gas temperature of the ALCO® 251 engine. The turbine inlet temperature increases from 755° to about 1000° C. for single aftercooler whereas the maximum temperature reached with the dual aftercooler arrangement is about 905° C. The substantial improvement in exhaust temperature is probably the best indicator of the lowering of heat stress on the various parts of the engine and the improvement in life expectancy of the engine.

The graphs, therefore, provide an excellent indication of the improvement a potential user of the ALCO® 251 engine may expect. For the environmentalist, the engine delivers more power on less fuel and the lowering of the combustion temperatures tends to decrease the generation of nitrous oxides. The engine lubricating oil may experience a longer life because of the decrease in temperature stress.

Over the life of the engine, the increase in efficiency from 1.8 to 3.8% for the Brake Specific Fuel Consumption will have a dramatic effect on operating costs of the engine. When this cost is considered in combination with the increased life expectancy of the engine, the savings produced by the combination GE 7S1716 dual discharge turbocharger with dual aftercoolers will prove to be substantial.

The embodiments of the invention in which an exclusive property or privilege is claimed are defined as follows:

1. An improvement for a sixteen cylinder diesel engine comprising:

the adaptation of a turbocharger having twin discharge ducts to the engine by means of a hollow adapter member, and the adaptation of a pair of aftercoolers to the engine such that each aftercooler is in communication with one duct of said turbocharger, said turbocharger and said aftercoolers being mounted on said adapter member so that said turbocharger is centrally located at the front of said engine, said aftercoolers being mounted on said adapter member in symmetrical relationship on either side of said turbocharger.

2. The ALCO®engine of claim 1 wherein:

said adapter member serves to provide support for said aftercoolers, as well as said turbocharger, said adapter member is essentially hollow, said hollow interior being in communication with the outlets of said aftercoolers, said adapter also being in communication with the air intake for said engine.

3. The engine as claimed in claim 1 wherein said adapter member is provided with suitable internal passages for coolant and lubrication conduits for the supply and return of said coolant and lubricant to and from said turbocharger.

4. A modified ALCO®251 16 cylinder diesel engine in which a prior art ALCO® 165 turbocharger and its single aftercooler are replaced with a GE 7S1716 twin discharge duct turbocharger and a pair of aftercoolers which are supportedly mounted on a hollow adapter member on said engine such that space requirements for said ALCO® engine in its modified and unmodified form occupy substantially the same space wherein said hollow adapter member is mounted on said engine so as to have the interior of said hollow adapter is in communication with the air intake of said engine, said turbocharger being mounted on said adapter member, said twin aftercoolers being supported on said adapter member, such that each aftercooler is metrically located with respect to a vertical plane passing through the axis of the crankshaft of said engine the longitudinal axis of each aftercooler being in parallel to said axis, such that the coolant tubes of each intercooler are parallel to said axis.

5. An ALCO® engine as claimed in claim 4, wherein each aftercooler is in communication with the output of each discharge duct, and the outlet of each aftercooler is in communication with the interior of said hollow adapter member, and said adapter member serves also to supply and return lubrication and coolant to said turbocharger.

6. A method of improving the performance of a V-16 diesel engine comprising: replacing a turbocharger and its single intercooler and mounting assembly with a turbocharger having twin discharge ducts and a pair of similarly shaped intercoolers mounted on an adapter member attached to said engine to supply air to the intake of said engine said twin discharge duct turbocharger being mounted on said adapter member centrally at the front of said engine, with said ducts each feeding one intercooler of said pair of intercoolers, said intercoolers being mounted on said adapter member on either side of the twin discharge duct turbocharger slightly below the twin discharge duct turbocharger.

* * * * *

UNITED STATES PATENT AND TRADEMARK OFFICE
CERTIFICATE OF CORRECTION

PATENT NO. : 5,544,486

DATED : August 13, 1996

INVENTOR(S) : Yao-Shun Lu

It is certified that error appears in the above-indentified patent and that said Letters Patent is hereby corrected as shown below:

In claim 2, line 1, delete "ALCO®".

Signed and Sealed this

Twenty-fifth Day of November, 1997

Attest:

BRUCE LEHMAN

Attesting Officer

Commissioner of Patents and Trademarks